United States Patent
Kangovi

(10) Patent No.: US 9,070,154 B2
(45) Date of Patent: *Jun. 30, 2015

(54) METHOD FOR PROVISIONING SUBSCRIBERS, PRODUCTS, AND SERVICES IN A BROADBAND NETWORK

(71) Applicant: Comcast Cable Holdings, LLC, Philadelphia, PA (US)

(72) Inventor: Sachidanada Kangovi, Princeton Junction, NJ (US)

(73) Assignee: Comcast Cable Holdings, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/058,779

(22) Filed: Oct. 21, 2013

(65) Prior Publication Data

US 2014/0108187 A1    Apr. 17, 2014

Related U.S. Application Data

(63) Continuation of application No. 13/033,721, filed on Feb. 24, 2011, now Pat. No. 8,594,289, which is a continuation of application No. 11/448,207, filed on Jun. 7, 2006, now Pat. No. 7,912,195.

(51) Int. Cl.
*H04M 3/42* (2006.01)
*G06Q 30/06* (2012.01)
*G06Q 30/02* (2012.01)
*H04L 29/12* (2006.01)

(52) U.S. Cl.
CPC ........... *G06Q 30/0621* (2013.01); *G06Q 30/02* (2013.01); *H04L 29/12047* (2013.01); *H04L 61/15* (2013.01)

(58) Field of Classification Search
USPC ............ 379/201.01; 709/220, 223, 224, 225, 709/226
See application file for complete search history.

(56) References Cited

U.S. PATENT DOCUMENTS

| | | |
|---|---|---|
| 5,966,434 A | 10/1999 | Schafer et al. |
| 5,999,610 A | 12/1999 | Lin et al. |
| 2001/0025280 A1 | 9/2001 | Mandato et al. |
| 2004/0039772 A1 | 2/2004 | De Miguel et al. |
| 2006/0265508 A1 * | 11/2006 | Angel et al. ................. 709/230 |

* cited by examiner

*Primary Examiner* — Quynh Nguyen
(74) *Attorney, Agent, or Firm* — Banner & Witcoff, Ltd.

(57) ABSTRACT

A method for provisioning subscribers, products, and services in a broadband network includes establishing a directory system for storing information about a plurality of subscribers. The directory system includes a subscriber namespace and a device namespace. A subscriber is added by instantiating a subscriber object for the subscriber in the subscriber namespace. Each available service has its own state in the directory system to provide a multi-state provisioning system that permits granular management services.

20 Claims, 3 Drawing Sheets

METHOD FOR PROVISIONING SUBSCRIBERS, PRODUCTS, AND SERVICES IN A BROADBAND NETWORK

CROSS REFERENCE TO RELATED APPLICATIONS

The present application is a continuation of and claims priority to co-pending U.S. application Ser. No. 13/033,721, filed Feb. 24, 2011, and having the same title, which claims priority to U.S. application Ser. No. 11/448,207 (now U.S. Pat. No. 7,912,195), filed Jun. 7, 2006, and titled "METHOD FOR PROVISIONING SUBSCRIBERS, PRODUCTS, AND SERVICES IN A BROADBAND NETWORK." Each of the above-mentioned applications is incorporated herein by reference in its entirety.

BACKGROUND OF THE INVENTION

1. Field of the Invention

The invention relates to provisioning subscribers, products, and services in a broadband network.

2. Background Art

Product and service offerings over broadband networks, including cable networks, have expanded in recent years. Originally intended as a way to provide television programming, the cable networks are now used for additional products and services. For example, many cable networks now offer high speed data service.

An existing approach to provisioning subscribers, products, and services in an existing broadband network architecture utilizes a directory system for storing information about subscribers. The directory system is restrictive as to what information is stored for a subscriber. The directory system stores three state-related attributes for each high speed data subscriber. The stored, state-related attributes for a particular subscriber, together, determine the state (for example, active or suspended) of the high speed data service for that subscriber. More specifically, the state-related attributes include a user status attribute, a provisioning context attribute, and a device status attribute. These attributes are hard coded in the directory system schema, and the provisioning system is coded to populate the attributes to account for various states during the service provisioning flows.

This existing approach to provisioning has been used successfully; however, there are opportunities for improvement. For example, all of the states are related to high speed data service because at one point in time, high speed data service was the only available service. As additional services are made available, high speed data service becomes just one of several available services, but the same states are still being used to determine the status of all services. Similarly, the service provisioning flows for a subscriber are single dimensional in that they are all tied to high speed data service. This existing approach to provisioning does not support provisioning multiple services in parallel.

Finally, in this existing approach to provisioning, there is no granular control of subscriber suspension, for example, for abuse. Because the high speed data states are used to determine the status of all services, flexibility is very limited.

In order to continue to introduce new products and services, it becomes necessary to provide new directory system schema, and provide new system code to populate the attributes in the directory system. For the foregoing reasons, there is a need for an improved method for provisioning subscribers, products, and services in a broadband network.

SUMMARY OF THE INVENTION

It is an object of the invention to provide a service-linked multi-state system for provisioning subscribers, products, and services.

In accordance with the invention, a method for provisioning subscribers, products, and services in a broadband network, such as a cable network, is provided. Various products and services can be provisioned; the invention includes a provisioning approach for handling many services and devices, using a dynamic and flexible approach for the data in the directory system.

In one aspect of the invention, each service being provisioned has its own provisioning context. In more detail, the directory system stores information about a plurality of subscribers, and includes a subscriber namespace and a device namespace. When a subscriber is added to the network, a subscriber object is instantiated in the subscriber namespace. The subscriber object includes a plurality of status attributes. Each available service has at least one corresponding status attribute. In this way, the provisioning system is a multi-state provisioning system that permits services to be managed granularly such that services may be, for example, active, suspended, deleted, etc. collectively or independent of each other.

Because each service being provisioned has its own provisioning context, services may be provisioned (that is, configured for use by the subscriber on the network) without interfering with each other. At a more detailed level, when a device is added to the network, a device object is instantiated for the subscriber in the device namespace. A product requested by the subscriber is associated with the device. Sometimes, different devices are needed to offer different products to the subscriber. A product may include a single network service, or a bundle of services. For example, a high speed data product may include high speed data service, and may further include some additional services. A template corresponding to the determined product is obtained, and the subscriber object and the device object are at least partially populated based on the obtained template. The status attribute or attributes corresponding to the service or services included in the product are set so as to indicate that the service or services are active. The end result is that the directory system includes, for each subscriber, a subscriber object in the subscriber namespace and one or more device objects in the device namespace. These objects contain detailed information about the subscriber, the subscriber's devices, associated products, and configured network services.

In an alternative implementation of the directory system, the directory system includes a subscriber namespace, a service namespace, and a device namespace. Instead of using status attributes of a subscriber object to indicate the status of a service, when a service is added, a service object is instantiated in the service namespace to store information about the service.

The advantages associated with embodiments of the invention are numerous. For example, the use of product-based templates facilitates population of the namespaces, and the dynamic approach for the data in the directory system reduces hard coding and facilitates rapid production of new products and services.

DETAILED DESCRIPTION OF THE PREFERRED EMBODIMENTS

Figure 1:
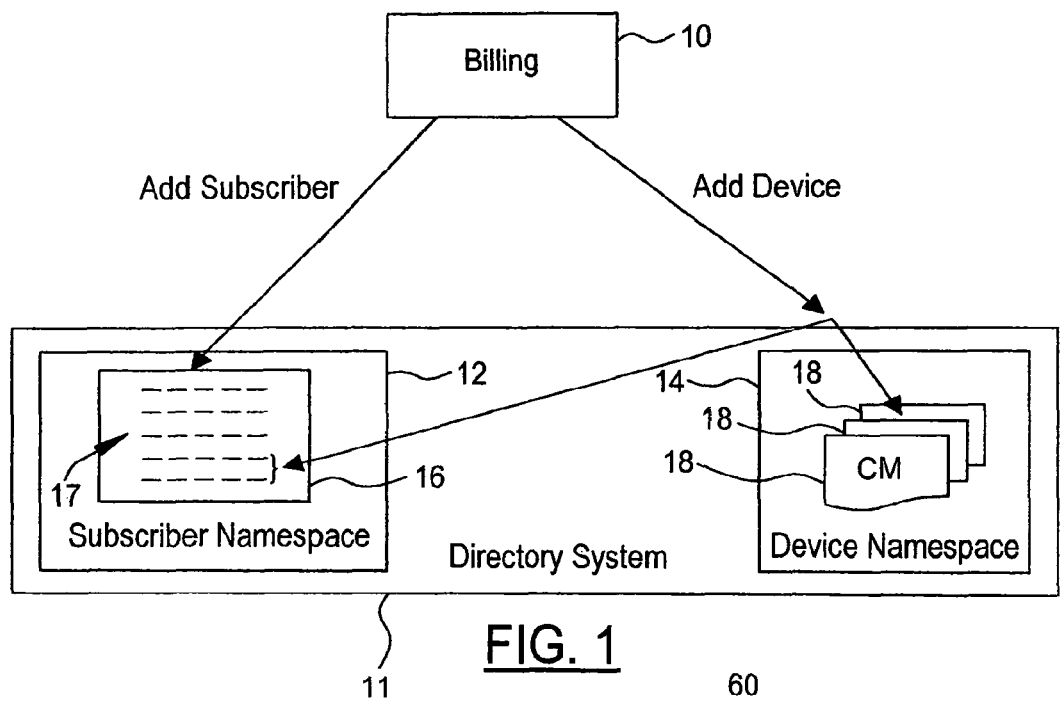
FIG. 1 illustrates a portion of the provisioning architecture including the billing system and a directory system including a subscriber namespace and a device namespace in accordance with a first embodiment of the invention.

With reference to FIG. 1, billing system 10 initiates changes to directory system 11 during provisioning by, for example, sending add commands to directory system 11. (Provisioning, generally, is configuring the network to provide a service for a subscriber.) Directory system 11 stores information about subscribers, products, and services. Directory system 11 includes a subscriber namespace 12 and a device namespace 14. (A namespace is a context for identifiers.) When a subscriber is added to the network, a subscriber object 16 for the subscriber is instantiated in subscriber namespace 12. Subscriber object 16 includes a plurality of status attributes 17. (An object is an identifier within a namespace. Attributes are characteristics of an object.) Each available network service has at least one corresponding status attribute. In addition, each service being provisioned has its own provisioning context. Network services may include, for example, Internet service, voice service, messaging service, or any other network service.

When a device (that is, an item of subscriber equipment) for a subscriber is added to the network, a device object 18 for the subscriber is instantiated in device namespace 14. One exemplary device is a cable modem. In more detail, when a device is added to the network, the provisioning system links a product requested by the subscriber (that is, a service offering by the network provider that may include one or more services) to the added device. For example, when a cable modem is the added device, the corresponding product may be a high speed data product. A product may encompass one or more network services. In order to facilitate populating the subscriber object 16 and the device object 18 to reflect the new services, a template corresponding to the determined product is obtained and used for populating the objects. During population of the subscriber object 16, the status attribute or attributes corresponding to the service or services associated with the added product are set so as to indicate that the service or services are now active.

Figure 2:
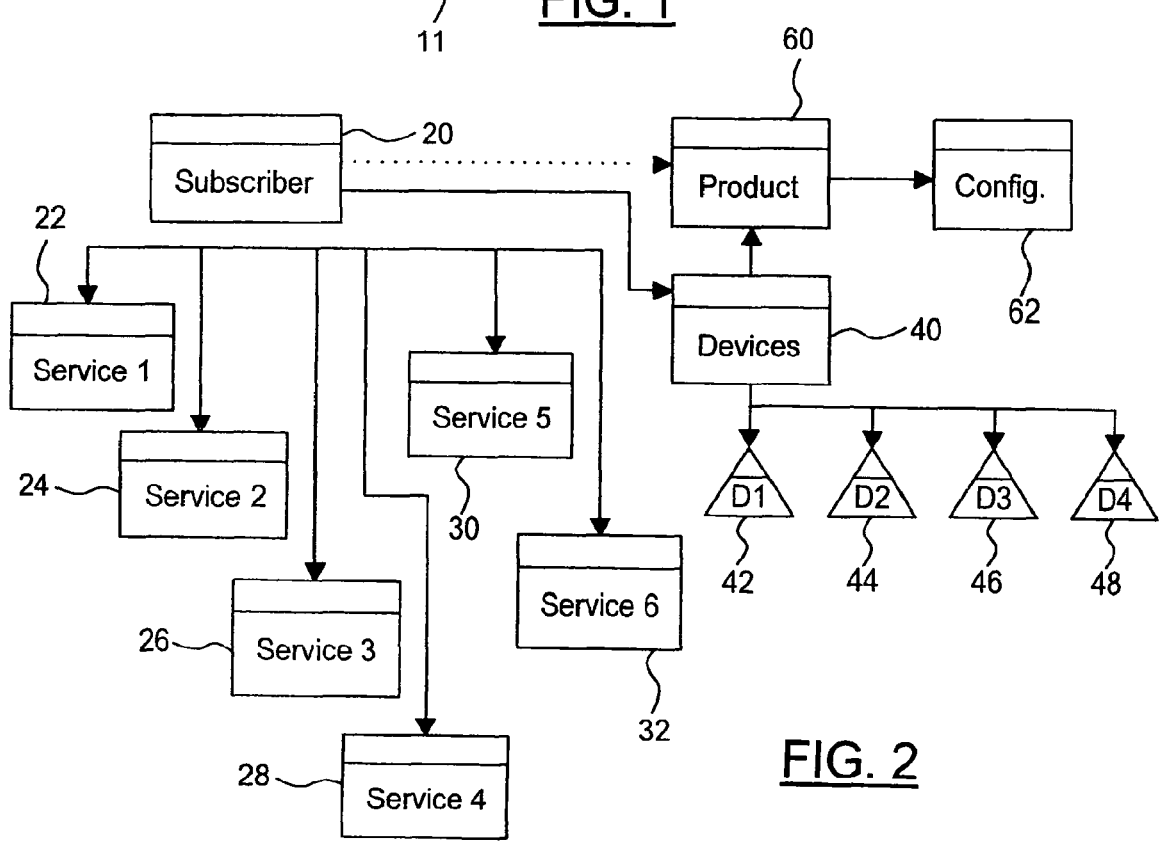
FIG. 2 is an entity relationship diagram for the embodiment illustrated in FIG. 1.

The subscriber and device objects 16 and 18 contain information about subscribers, products, and services. More specifically, for each subscriber, directory system 11 includes detailed information about the subscriber's devices, associated products, and configured network services. The relationship between subscriber, product, service, and device information contained in directory system 11 is shown in the entity relationship diagram of FIG. 2. Entity 20 represents the subscriber, and entities 22, 24, 26, 28, 30, 32 represent the plurality of service-related attributes. These entities represent the information in the subscriber object 16 (FIG. 1). In the entity diagram, a device is represented by devices entity 40, and individual device attributes 42, 44, 46, 48. The product associated with the device is indicated by product entity 60 while the template containing configuration parameters for the product is represented by configuration entity 62.

Embodiments of the invention for provisioning subscribers, products, and services in a broadband network have many advantages. Prior approaches for the directory system were restrictive as to what information could be stored for a subscriber, all states were related to high speed data service, and service provisioning flows were one-dimensional and strictly associated with high speed data service. Embodiments of the invention provide a flexible and dynamic approach for managing information in the directory system to handle many services and devices in the broadband network. Embodiments of the invention provide a multi-state system in that a subscriber object 16 includes appropriate attributes 17 for each available service such that each service can have its own independent state.

Figure 3:
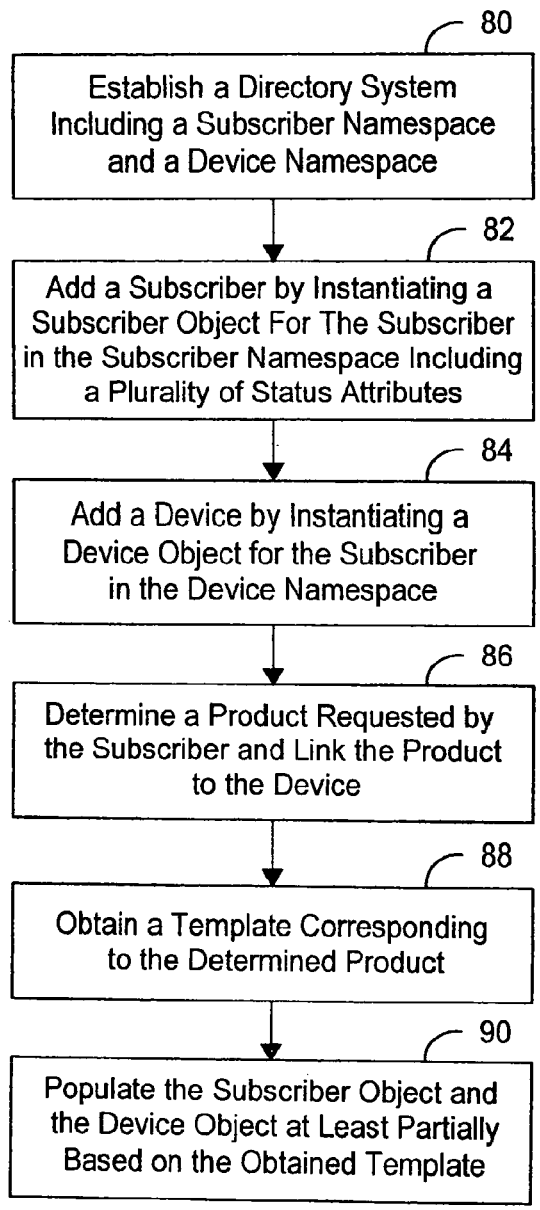
FIG. 3 is a block diagram illustrating a provisioning method in the first embodiment of the invention.

With reference to FIG. 3, an exemplary provisioning method is illustrated. At block 80, a directory system is established. The directory system is for storing information about subscribers, and includes a subscriber namespace and a device namespace. When the billing system instructs that a subscriber is to be added to the directory system, a subscriber is added by instantiating a subscriber object for the subscriber in the subscriber namespace, as indicated by block 82. The subscriber object includes a plurality of status attributes. Each available network service has at least one corresponding status attribute to provide a multi-state provisioning system that permits granular management of services. More specifically, each service may have its own state indicated by the value of the appropriate attribute or attributes of the subscriber object.

Further, the billing system may send an "add equipment" request to the directory system (for a current subscriber or a new subscriber). In response, as indicated at block 84, a device is added by instantiating a device object for the subscriber in the device namespace. The device is related to the subscriber. Both the subscriber object and the device object may contain a reference to the same subscriber account to achieve this relation.

With continuing reference to FIG. 3, when a device object is created, a product sent by the billing system is linked to the device as indicated at block 86. At block 88, a template corresponding to the determined product is obtained. At block 90, the subscriber object and the device object are populated at least partially based on the obtained template.

Figure 4:
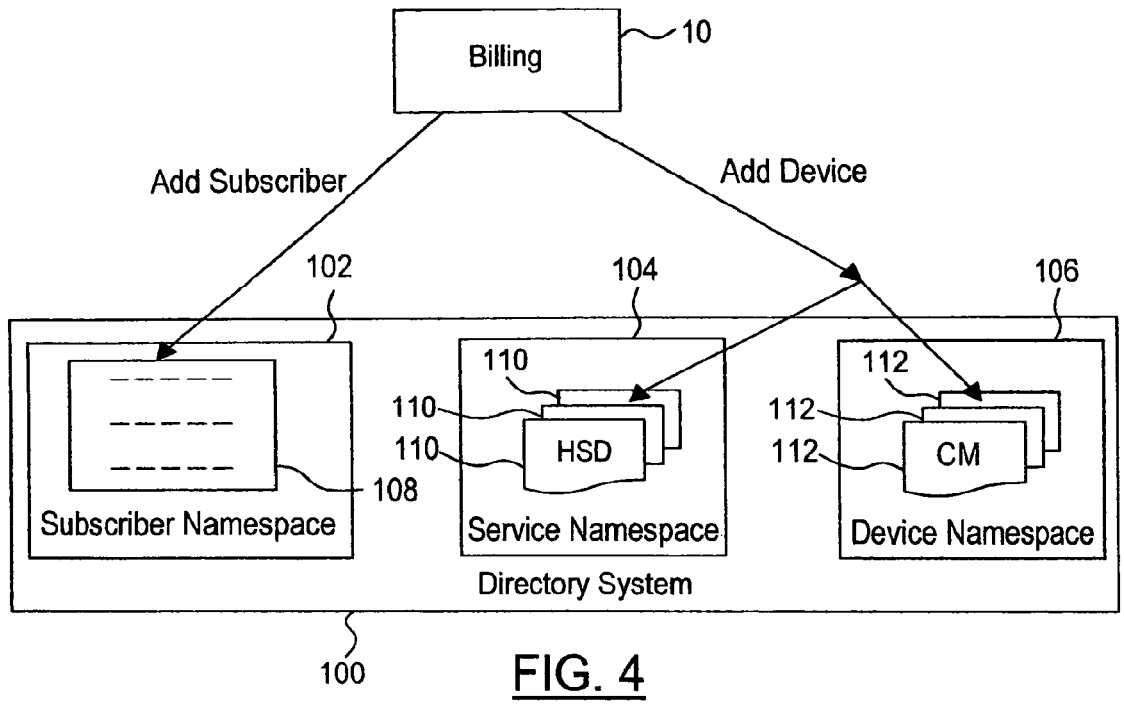
FIG. 4 illustrates a portion of the provisioning architecture including the billing system and a directory system including a subscriber namespace, a service namespace, and a device namespace, in accordance with an alternative embodiment of the invention.

With reference to FIG. 4, billing system 10 initiates changes to directory system 100 during provisioning by, for example, sending add commands to directory system 100. Directory system 100, in this alternative embodiment, stores information about subscribers, devices, and services. Directory system 100 includes a subscriber namespace 102, service namespace 104, and device namespace 106. When a subscriber is added to the network, a subscriber object 108 for the subscriber is instantiated in subscriber namespace 102.

For each available service, a service for the subscriber is added by instantiating a corresponding service object 110 for the subscriber in service namespace 104. Each service object 110 has a state to provide a multi-state provisioning system that permits granular management of services, and gives each service being provisioned its own provisioning context. Services may include, for example, Internet service, voice service, messaging service, or any other network service.

When a device for a subscriber is added to the network, a device object 112 for the subscriber is instantiated in device namespace 106. More specifically, the provisioning system links the product requested by the subscriber to the added device. The corresponding product may encompass one or more network services. In order to facilitate populating the namespaces to reflect the new services, a template corresponding to the determined product is obtained and used for populating the objects. Each service object 110 has its state set so as to indicate that the service is active at the conclusion of provisioning.

Figure 5:
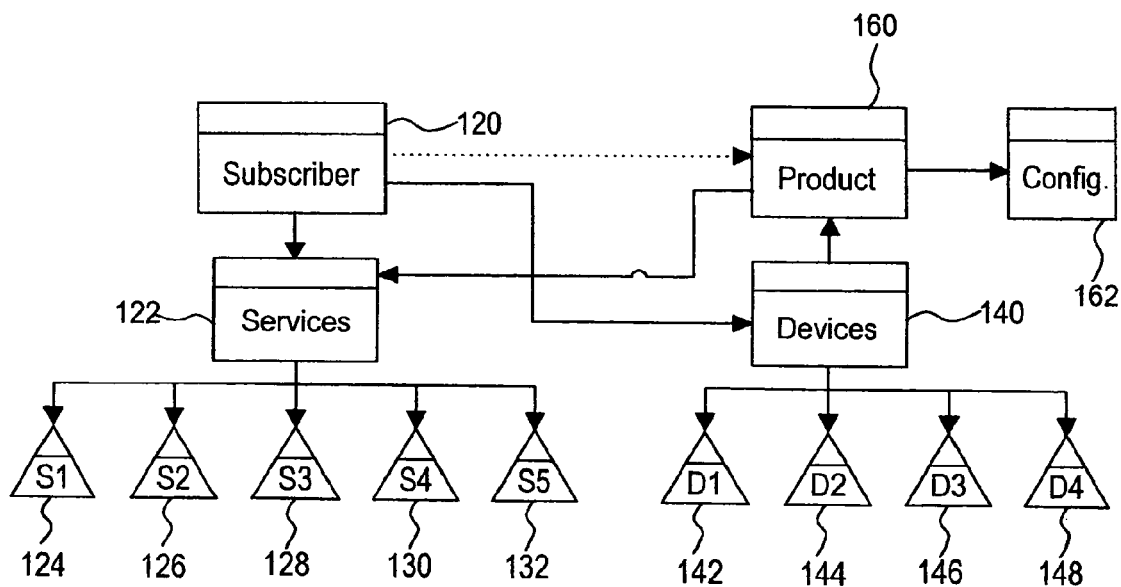
FIG. 5 is an entity relationship diagram for the embodiment illustrated in FIG. 4.

In this alternative embodiment, the subscriber, service, and device objects 108, 110, 112 contain information about subscribers, products, and services. The relationship between subscriber, product, service, and device information contained in directory system 100 is shown in the entity relationship diagram of FIG. 5. Entity 120 represents a subscriber. A service is represented by services entity 122, and individual service entities 124, 126, 128, 130, 132. Further, a device is represented by devices entity 140, and individual device entities 142, 144, 146, 148. The product associated with the device is indicated by product entity 160, while services are related to the product and configuration parameters for the product are represented by configuration entity 162.

Figure 6:
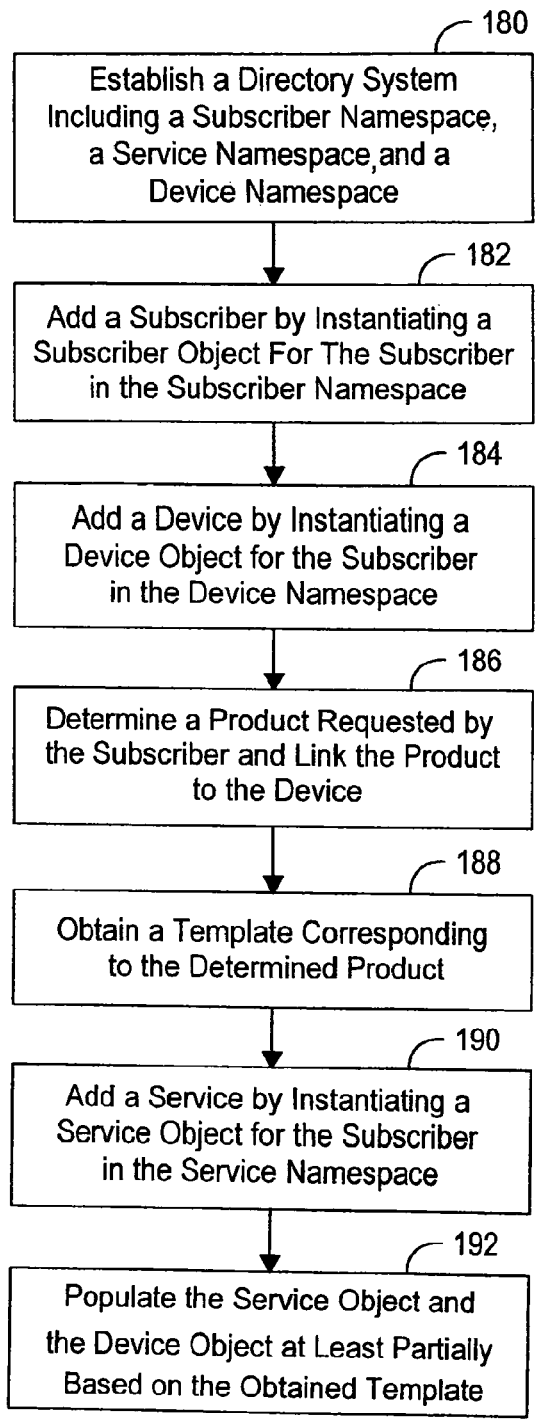
FIG. 6 is a block diagram illustrating a provisioning method in the alternative embodiment of the invention.

With reference to FIG. 6, an exemplary provisioning method in this alternative embodiment is illustrated. At block 180, a directory system is established. The directory system is for storing information about subscribers, and includes a subscriber namespace, a service namespace, and a device namespace. When the billing system instructs that a subscriber is to be added to the directory system, a subscriber is added by instantiating a subscriber object for the subscriber in the subscriber namespace, as indicated at block 182. As indicated at block 184, a device is added by instantiating a device object for the subscriber in the device namespace.

With continuing reference to FIG. 6, when a device object is created, a product requested by the subscriber is linked to the device, as indicated at block 186. A template corresponding to the determined product is obtained at block 188. For each available network service, as shown at block 190, the service is added for the subscriber by instantiating a service object for the subscriber in the service namespace. Each service object has a state to provide a multi-state system. At block 192, the device object and any appropriate service objects are populated at least partially based on the obtained template.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

I claim:

1. A method comprising:
   instantiating a user object for a user in a user namespace;
   instantiating a device object for the user in a device namespace, the device object comprising information related to user equipment associated with the user;
   retrieving configuration parameters that identify one or more services available to the user;
   for each of the one or more services available to the user, instantiating a corresponding service object for the user in a service namespace, resulting in one or more instantiated service objects, each of the one or more instantiated service objects comprising a state identifier; and
   populating, based at least in part on the configuration parameters, by a computing device, each of the one or more instantiated service objects by at least setting the state identifier of each of the one or more instantiated service objects to indicate an active service state.

2. The method of claim 1, further comprising:
   establishing a directory system for storing information about a plurality of users, the directory system including the user namespace, the device namespace, and the service namespace.

3. The method of claim 1 further comprising:
   determining a service based on a product that corresponds to the configuration parameters.

4. The method of claim 3, wherein the product is a high speed data product.

5. The method of claim 1, wherein the one or more services available to the user comprise an Internet service.

6. The method of claim 1, wherein the one or more services available to the user comprise a voice service.

7. The method of claim 1, wherein the one or more services available to the user comprise a messaging service.

8. The method of claim 1, further comprising:
   receiving an add equipment request, wherein instantiating the device object is performed in response to receiving the add equipment request.

9. The method of claim 1, further comprising:
   receiving an add user command from a billing system.

10. The method of claim 1, wherein the one or more instantiated service objects comprises a first service object for a high speed data service.

11. The method of claim 1, wherein the configuration parameters form at least a part of a template.

12. A method comprising:
    retrieving configuration parameters that identify one or more services available to a user;
    for each of the one or more services available to the user, instantiating a corresponding service object for the user in a service namespace, resulting in one or more instantiated service objects, each of the one or more instantiated service objects comprising a state identifier; and
    populating, based at least in part on the configuration parameters, by a computing device, each of the one or more instantiated service objects by at least setting the state identifier of each of the one or more instantiated service objects to indicate an active service state.

13. The method of claim 12, further comprising:
    establishing a directory system for storing information about a plurality of users, the directory system including the service namespace.

14. The method of claim 12, further comprising:
    determining a service based on a product that corresponds to the configuration parameters.

15. The method of claim 14, wherein the product is a high speed data product.

16. The method of claim 12, wherein the one or more instantiated service objects comprises a first service object for a high speed data service.

17. The method of claim 12, wherein the configuration parameters form at least a part of a template.

18. The method of claim 12, wherein the one or more services available to the user comprise an Internet service.

19. The method of claim 12, wherein the one or more services available to the user comprise a voice service.

20. The method of claim 12, wherein the one or more services available to the user comprise a messaging service.

* * * * *